US012344160B2

(12) United States Patent
Quan et al.

(10) Patent No.: US 12,344,160 B2
(45) Date of Patent: Jul. 1, 2025

(54) LIGHTING DEVICE AND HEADLAMP FOR A VEHICLE WITH LUMINOUS MODULES AND ADJUSTMENT MEANS

(71) Applicant: VALEO VISION, Bobigny (FR)

(72) Inventors: Jun Quan, Wuhan (CN); Nicolas Crasnier, Angers (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 18/698,495

(22) PCT Filed: Oct. 21, 2022

(86) PCT No.: PCT/EP2022/079353
§ 371 (c)(1),
(2) Date: Apr. 4, 2024

(87) PCT Pub. No.: WO2023/072747
PCT Pub. Date: May 4, 2023

(65) Prior Publication Data
US 2024/0416823 A1 Dec. 19, 2024

(30) Foreign Application Priority Data
Oct. 27, 2021 (FR) ..................................... 2111385

(51) Int. Cl.
*B60Q 1/06* (2006.01)
*F21S 41/657* (2018.01)

(52) U.S. Cl.
CPC .............. *B60Q 1/06* (2013.01); *F21S 41/657* (2018.01)

(58) Field of Classification Search
CPC ............................ F21S 41/657; B60Q 1/0683
See application file for complete search history.

(56) References Cited

U.S. PATENT DOCUMENTS

| 11,548,431 | B2* | 1/2023 | Chen .................... B60Q 1/0683 |
| 2008/0247182 | A1 | 10/2008 | Yasuda et al. |
| 2014/0185307 | A1 | 7/2014 | Lee et al. |
| 2021/0140602 | A1* | 5/2021 | Youn .................... F21S 41/657 |
| 2022/0097598 | A1 | 3/2022 | Chen et al. |

FOREIGN PATENT DOCUMENTS

| EP | 3 907 106 A1 | 11/2021 |
| WO | WO 2020/135373 A1 | 7/2020 |
| WO | WO 2021/209021 A1 | 10/2021 |

OTHER PUBLICATIONS

International Search Report mailed on Jan. 2, 2023 in PCT/EP2022/079353 filed on Oct. 21, 2022 (2 pages).
Preliminary French Search Report dated Jul. 5, 2022 in French Application 2111385 filed on Oct. 27, 2021 (3 pages, with Translation of Categories).

* cited by examiner

*Primary Examiner* — Robert J May
(74) *Attorney, Agent, or Firm* — Oblon, McClelland, Maier & Neustadt, L.L.P.

(57) ABSTRACT

A lighting device for a headlamp of a vehicle includes a main mounting plate, and a plurality of separate luminous modules each mounted on an intermediate support. Each intermediate support is movably mounted relative to the main mounting plate about a pivot axis specific to the module in question. The device further includes at least one member for coupling an assembly or sub-assembly of two modules of the plurality of modules, connecting the intermediate supports bearing the two modules so as to allow the simultaneous movement of said two modules.

14 Claims, 10 Drawing Sheets

LIGHTING DEVICE AND HEADLAMP FOR A VEHICLE WITH LUMINOUS MODULES AND ADJUSTMENT MEANS

The invention relates to a lighting device for a headlamp, in particular for a front headlamp of a vehicle. The invention also relates to a vehicle provided with such a lighting device.

Automotive vehicles are conventionally provided with headlamps, in particular front headlamps, or headlights, intended to illuminate the road in front of the vehicle at night or under low light conditions. These headlamps can generally be used in two lighting modes: a first "high beam" mode and a second "low beam" mode. The "high beam" mode makes it possible to light the road brightly far in front of the vehicle. The "low beam" mode provides more limited lighting of the road, but nonetheless offers good visibility without dazzling other road users. To this end, headlamps can comprise one or more separate luminous modules.

Conventionally, each luminous module is mounted on at least one movable support that is in particular able to pivot in order to allow the adjustment of the inclination of the luminous modules in order to ensure that the road is adequately lit by the luminous modules without adversely affecting other road users. Such a movable support is moved by means of one or more adjustment means and can be a main support, common to a plurality of luminous modules, or an intermediate support, specific to a given module.

In particular, when the headlamp comprises a plurality of luminous modules, it is known practice to be able to implement the independent or simultaneous adjustment of said modules via coupling means. However, such coupling means have the drawback of being bulky, complex, and unsuitable for an increased number of luminous modules, for example in the case of a headlamp comprising more than two luminous modules. In addition, the coupling means are limited by the numerous dimensional constraints imposed by the esthetic appearance of the vehicle, by the space available for the incorporation thereof, and by the different lighting functions that the headlamp must accommodate.

The present invention falls within this context and aims to provide a lighting device comprising a plurality of luminous modules allowing simple and suitable adjustment of the luminous modules while minimizing the footprint of the lighting device.

The invention relates to a lighting device for a headlamp, in particular a front headlamp, of a vehicle, the lighting device comprising a main mounting plate, a plurality of separate luminous modules, in particular at least two luminous modules, each mounted on an intermediate support, each intermediate support being movably mounted, relative to the main mounting plate, about a pivot axis specific to the luminous module in question, in particular a horizontal axis, the pivot axes of the different luminous modules being parallel and separate. The lighting device further comprises:
- first adjustment means configured to move the main mounting plate about a first adjustment axis, in particular a vertical axis, orthogonal to the pivot axes of the modules, and allowing the simultaneous movement of the plurality of modules;
- second adjustment means configured to move at least two modules of the plurality of modules simultaneously relative to the main mounting plate, each by tilting about the pivot axis specific thereto;
- at least one member for coupling an assembly or sub-assembly of two modules of the plurality of modules, connecting the intermediate supports bearing said two modules so as to allow the simultaneous movement of said two modules by transfer of the movement of one of the two modules to the other of the two modules and vice versa.

According to a first embodiment, the two luminous modules can be at least partially superposed along a direction orthogonal to the pivot axes, in particular along a vertical direction. In particular, the two luminous modules can be offset relative to each other along a direction orthogonal to the first adjustment axis and to the pivot axes, in particular a longitudinal direction.

The coupling member can comprise a rod connected to one of the two modules in a first coupling zone and to the other of the two modules in a second coupling zone, the rod being bent so that it has at least a first elbow, extending in the vicinity of the first coupling zone, and a second elbow, extending in the vicinity of the second coupling zone.

In particular, a distance, along the direction defined by the first adjustment axis, separating the pivot axis of one of the two modules from the first coupling zone, can be identical to a distance separating the pivot axis of the other of the two modules from the second coupling zone.

The lighting device can further comprise at least one guide means for guiding the coupling member at least partially connected to the intermediate support specific to one of the two modules and/or at least partially connected to the intermediate support specific to the other of the two modules.

According to a second embodiment, the two luminous modules can be juxtaposed along a direction parallel to the pivot axes, in particular along a horizontal direction. In particular, the two luminous modules can be offset relative to each other along a direction orthogonal to the first adjustment axis and to the pivot axes, in particular a longitudinal direction.

According to the second embodiment, the coupling member can comprise a slider connected to one of the two modules in a first coupling zone and to the other of the two modules in a second coupling zone, the slider being configured to interact with the main mounting plate in order to be moved along a direction perpendicular to the first adjustment axis and to the pivot axes, in particular a longitudinal direction.

In particular, a distance, along the direction defined by the first adjustment axis, separating the pivot axis of one of the two modules from the first coupling zone, can be identical to a distance separating the pivot axis of the other of the two modules from the second coupling zone.

According to a third embodiment, the lighting device can comprise three luminous modules. According to one example, said two luminous modules are formed by a first luminous module and a second luminous module, and the lighting device further comprises a third luminous module movably mounted on the main mounting plate via an intermediate support at two pivot points defining a pivot axis specific to the third luminous module and parallel to the pivot axes of the first module and/or the second module. The device is then configured so that the first adjustment means allow the simultaneous movement of the three modules about the first adjustment axis via the main mounting plate and the second adjustment means allow the simultaneous movement of at least two of the three modules about the pivot axis specific thereto.

According to a particular embodiment, the first luminous module and the second luminous module are at least partially superposed along a direction orthogonal to the pivot axes, in particular along a vertical direction, and the second luminous module and the third luminous module are juxtaposed along a direction parallel to the pivot axes, in particular along a horizontal direction, said at least one coupling member comprising a first member (25a) for coupling the first module (211a) and the second module (211b) connecting the intermediate supports (217a, 217b) bearing the first and second modules so as to allow the simultaneous movement of the first and second modules by transfer of the movement of one of the first and second modules to the other of the first and second modules and vice versa, and a second member (25b) for coupling the second module (211b) to the third module (211c) connecting the intermediate supports (217b, 217c) bearing the second and third modules so as to allow the simultaneous movement of the second and third modules by transfer of the movement of one of the second and third modules to the other of the second and third modules and vice versa, so that the second adjustment means allow the simultaneous movement of the three modules about their respective pivot axes.

The first and second luminous modules can be offset relative to each other along a direction orthogonal to the first adjustment axis and to the pivot axes, in particular a longitudinal direction.

The first coupling member can comprise a rod connected to one of the first and second modules in a first coupling zone and to the other of the first and second modules in a second coupling zone, the rod being bent so that it has at least a first elbow, extending in the vicinity of the first coupling zone, and a second elbow, extending in the vicinity of the second coupling zone.

A distance, along the direction defined by the first adjustment axis, separating the pivot axis of one of the first and second luminous modules from the first coupling zone, can be identical to a distance separating the pivot axis of the other of the first and second luminous modules from the second coupling zone.

The lighting device can further comprise at least one guide means for guiding the first coupling member at least partially connected to the intermediate support specific to one of the first and second modules and/or at least partially connected to the intermediate support specific to the other of the first and second modules.

The second and third luminous modules can be offset relative to each other along a direction orthogonal to the first adjustment axis and to the pivot axes, in particular a longitudinal direction.

The second coupling member can comprise a slider connected to one of the second and third modules in a first coupling zone and to the other of the second and third modules in a second coupling zone, the slider being configured to interact with the main mounting plate in order to be moved along a direction perpendicular to the first adjustment axis and to the pivot axes, in particular a longitudinal direction.

A distance, along the direction defined by the first adjustment axis, separating the pivot axis of one of the second and third modules from the first coupling zone, can be identical to a distance separating the pivot axis of the other of the second and third modules from the second coupling zone.

In particular, irrespective of the embodiment implemented, the first adjustment axis can be interposed between at least two of the three luminous modules along the direction parallel to the pivot axes.

In particular, irrespective of the embodiment implemented, the first adjustment axis can be centered within the main mounting plate along a direction parallel to the pivot axes.

The invention can also extend to an automotive vehicle comprising at least one lighting device as set out above.

Further details, features and advantages will become more clearly apparent upon reading the detailed description given below by way of non-limiting indication and with reference to the various exemplary embodiments illustrated in the following figures.

Figure 1:
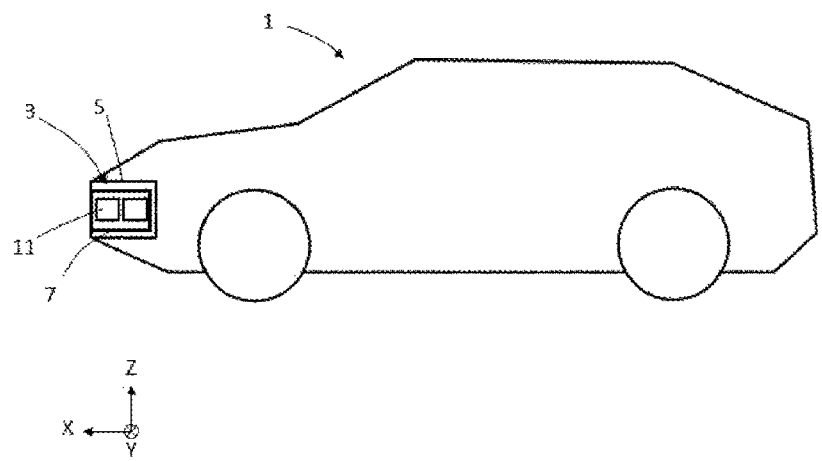
FIG. 1 is a schematic view of a vehicle according to one embodiment.

FIG. 1 schematically illustrates an embodiment of a vehicle 1, in particular an automotive vehicle 1 provided with one or more headlamps 3. In this instance, the headlamps 3 in question are front headlamps.

By convention, in the description below, the direction in which an automotive vehicle 1 moves in a straight line is defined as being the longitudinal direction X. The forward direction corresponds to the direction in which the automotive vehicle 1 usually travels along the longitudinal direction and is opposite to the reverse direction. The direction perpendicular to the longitudinal direction and situated in a plane parallel to the ground is referred to as the transverse direction Y. The direction perpendicular to the directions X and Y, in other words orthogonal to the ground on which the vehicle 1 is standing, is referred to as the vertical direction Z. A direct reference system XYZ shown in the figures requiring it is thus defined.

Likewise, the terms "vertical", "horizontal", "up", "down", "right", and "left" refer to directions or orientations easily identifiable in the operating position of a headlamp provided on a vehicle 1. The term "up" denotes an orientation toward the roof and/or hood of the vehicle 1, while the term "down" denotes an orientation toward a sill of the vehicle 1. The term "right" denotes an orientation toward the right-hand side of a road scene in the direction of travel of the vehicle 1, while the term "left" denotes an orientation toward the left-hand side of a road scene in the direction of travel of the vehicle 1.

Figure 2:
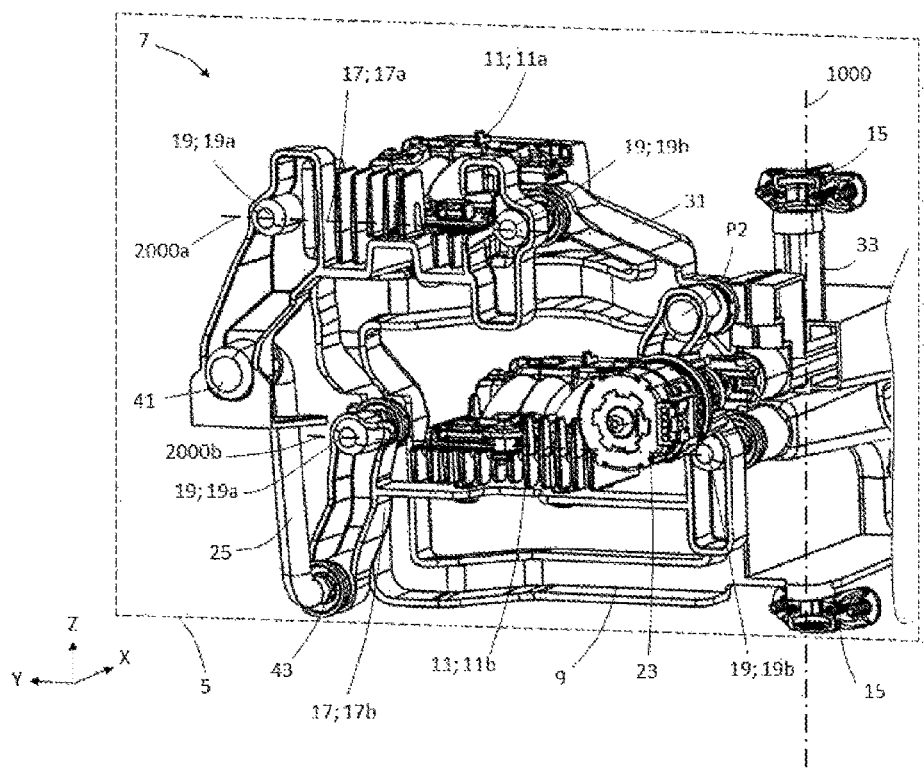
FIG. 2 is a partial schematic depiction of a lighting device according to a first embodiment.

The headlamp 3 comprises a housing 5, schematically depicted in dashed lines in FIG. 2 in particular, open on one side, and in which at least one lighting device 7 is positioned. The headlamp 3 also comprises an outer lens, not shown, closing the opening of the housing 5.

Generally, the lighting device 7 comprises a main mounting plate 9 on which a plurality of separate luminous modules 11, that is at least two luminous modules 11, are mounted. By way of non-limiting example, each luminous module 11 can consist of a module 11 emitting a low beam and/or a high beam. For example, a luminous module can comprise at least one light source and one or more optics for shaping the light beams emitted by the light source, and optionally a heat sink.

The main mounting plate 9 is movably mounted relative to the housing 5. The lighting device 7 comprises first adjustment means 13 positioned on the main mounting plate 9 and configured to move the main mounting plate 9 about a first adjustment axis 1000 in order to allow the simultaneous movement of the different modules 11 of the plurality of modules 11 borne by the main mounting plate 9. Such adjustment means can been seen in particular in FIGS. 7 and 10. For example, the main mounting plate 9 comprises rotation means 15 having a shape complementary to receiving means, not shown, contained in the housing 5. Such rotation means 15 and receiving means together define a pivot connection, for example.

The first adjustment means 13 act in particular on a first actuation point P1 contained in the main mounting plate and configured to rotate the main mounting plate 9 about the first adjustment axis 1000. Preferably, such a first actuation point P1 therefore extends at a non-zero distance from the first adjustment axis 1000. As a result, the mounting plate entirely bears the plurality of luminous modules 11 specific to the lighting device 7 and the luminous modules 11 are free of any direct mechanical connection to the housing 5.

In the example illustrated, the first adjustment axis 1000 extends parallel, or substantially parallel, to the vertical direction Z. The main mounting plate 9 can thus pivot horizontally to the right or the left so as to allow the adjustment of an angular position of the main mounting plate 9 and of the luminous modules 11 relative to the housing 5 about the first adjustment axis 1000. As the luminous modules 11 are entirely borne by the main mounting plate 9, it will be understood that adjusting the angular position of the main mounting plate allows the simultaneous adjustment of the angular position of the luminous modules 11. According to one alternative, not shown, the first adjustment axis 1000 can extend parallel to the transverse direction Y.

The luminous modules 11 are also movably mounted relative to the main mounting plate 9 via a plurality of intermediate supports 17. In particular, the lighting device 7 comprises as many intermediate supports 17 as luminous modules 11 so that each given luminous module 11 is mounted on an intermediate support 17 specific to it. In particular, the intermediate support of each luminous module is separate from the elements forming the luminous module. The intermediate support therefore differs from a heat sink. For example, the intermediate support can be made from a synthetic polymer material, preferably not thermally conductive, such as plastic.

The intermediate supports 17 are each connected to the main mounting plate 9 at two pivot points 19 defining a pivot axis 2000 specific to the intermediate support 17, and by extension to the luminous module 11 in question, said pivot axes 2000 being separate from one module 11 to another. Here, "pivot point" is given to mean a connecting zone between the main mounting plate 9 and a given intermediate support 17. In particular, the pivot points 19 correspond to pivot elements 21, for example of the ball joint connection type, allowing the luminous module 11 to pivot about its pivot axis 2000. The different pivot axes 2000 of a luminous module 7 are parallel to each other. Preferably, they extend parallel to the horizontal direction, and are particularly oriented substantially in the transverse direction Y depending on the embodiment.

The lighting device 7 further comprises second adjustment means 23 configured to simultaneously move all or some of the modules 11 of the plurality of modules relative to the main mounting plate 9. The second adjustment means 23 make it possible to tilt each luminous module 11 about its specific pivot axis 2000, here horizontal or substantially horizontal, so as to adjust the height of the beams projected, for example as a function of the attitude of the vehicle 1. According to the alternative mentioned above, the second adjustment means can allow adjustment about vertical or substantially vertical axes. The second adjustment means 23 act on a second actuation point P2, contained in one of the intermediate supports 17, and make it possible to operate the pivoting of the intermediate supports 17 relative to the main mounting plate 9 about their respective pivot axes.

In order to ensure the simultaneous movement of at least some of the luminous modules 11 of the plurality of luminous modules 11 during the adjustment of the height of the light beams, the lighting device 7 comprises at least one member 25 for coupling two modules 11 of the plurality of modules 11. Such a coupling member 25 connects the intermediate supports 17 bearing said modules 11 so as to allow their simultaneous movement by transfer of the movement of one of the two modules 11 to the other of the two modules 11 and vice versa. In other words, at least two modules and a coupling member 25 can form an assembly or sub-assembly within the plurality of modules 11 of the lighting device 7. The coupling member 25 can be produced according to different alternatives, set out below, depending on the relative positioning of the two luminous modules 11 in question.

FIGS. 2 to 6 illustrate an exemplary embodiment of a lighting device 7 according to a first embodiment. The lighting device 7 comprises the different components as set out above and has at least two luminous modules 11, referred to hereafter as the first module 11a and second module 11b, respectively borne by a first intermediate support 17a and a second intermediate support 17b of the intermediate supports 17 mentioned above. Said modules 11a, 11b are particularly positioned in the headlamp 3 so that they are at least partially superposed along a direction orthogonal to their pivot axes 2000, in particular along the vertical direction Z. In other words, at least one vertical axis passes through the first module 11a and the second module 11b. In this instance, the second module 11b has a lower position, along the vertical direction Z, than the first module 11a.

In the example illustrated, the first module 11a can in particular be a low beam lamp, while the second module can be a high beam lamp. Also alternatively, the first module and the second module can be two beams of the same lamp, in particular a low beam lamp. For example, the first module 11a can form a beam comprising a flat or substantially flat upper cut-off, corresponding to a "flat" beam, and the second module 11b can form a beam comprising an upper cut-off with an oblique portion, corresponding to a "kink" beam, or vice versa.

In such an embodiment, the main mounting plate 9 comprises at least one frame 27 configured to bear the second intermediate support 17b and the second module 11b so as to surround it. The frame 27 is in particular closed and made up of a plurality of branches 29, which can be at least partially straight and/or curved. The main mounting plate 9 further comprises two members 31, integrally formed with the frame 27, that extend upward and are configured to bear the first intermediate support 17a and the first module 11a. As a result, when the headlamp 3 is in position in the vehicle 1, the first intermediate support 17a and/or the first module 11a extend(s) at least partially between the two members 31.

The frame 27 and the members 31 advantageously form a one-piece assembly, that is, they cannot be separated from each other without damaging or even destroying them. It will be noted that the shape of the main mounting plate illustrated is in no way limiting. Its shape can therefore for example be inverted so that the frame 27 surrounds the first module 11a, or so that the members 31 extend downward. Likewise, according to an alternative not shown, the members 31 can be added and fastened, for example by screwing or welding, to the frame 27. Again alternatively, the frame 27 can be shaped and/or sized to directly bear the first intermediate support 17a and the second intermediate support 17b.

As disclosed above, the main mounting plate 9 is movable about the first adjustment axis 1000, here vertical. It bears two rotation means 15 defining a pivot connection and allowing it to move relative to the housing 5 of the headlamp about the first adjustment axis 1000. These two rotation means 15 can in particular be positioned on opposite portions or ends, along the vertical direction, of the main mounting plate 9, for example at free ends of a column 33 connected to the frame 27.

The intermediate supports 17 are movably mounted, particularly pivotably mounted, relative to the main mounting plate 9. Each of the intermediate supports 17 comprises for example a plate 35, on which the luminous module 11 in question is at least partially positioned, and two arms 37 connected to the plate 35 and extending on either side of it.

According to a non-limiting example, the first intermediate support 17a is substantially H-shaped. The plate 35 extends at least partially in a horizontal or substantially horizontal plane. A first pivot point 19a, contributing to the definition of the pivot axis 2000 of the first luminous module 11a, hereafter referred to as the first pivot axis 2000a, is contained in a first arm 37a. A second pivot point 19b is contained in a second arm 37b. The pivot points 19 comprise in particular heads configured to interact with connecting means 39 having a complementary shape, contained in the main mounting plate 9. In this instance, the first intermediate support 17a is fastened on the members 31 of the main mounting plate 9. Likewise, the pivot points 19a, 19b of the first intermediate support 17a are aligned, or substantially aligned, in a plane parallel to the ground.

Similarly, the second intermediate support 17b comprises a plate 35 and two arms 37. The arms 37 extend on either side of said plate 35 along the transverse direction Y and the vertical direction Z in the example illustrated. Each arm 37 comprises a pivot point 19a, 19b as described above, this being formed by a connection with the main mounting plate 9 made on the frame 27. In particular, the arm 37 of the second intermediate support 17b interacts with two opposite branches 29 of the frame 27.

Likewise, the first intermediate support 17a and second intermediate support 17b are indirectly connected to each other via the coupling member 25. In particular, the coupling member 25 is connected to a first coupling zone 41 contained in the first intermediate support 17a and to a second coupling zone 43 contained in the second intermediate support 17b.

According to the particular exemplary embodiment illustrated, the first module 11a and the second module 11b are offset relative to each other along the longitudinal direction X. In other words, said modules 11 are offset along a direction orthogonal to the first adjustment axis 1000 and to the pivot axes. For example, such an offset can be assessed on a front face or at the pivot points specific to each of said modules 11. In this instance, the second module 11b has a position further forward than the first module 11a along the longitudinal direction and the second coupling zone 43 is offset toward the front, along the longitudinal direction, relative to the first coupling zone 41. Such positioning is in particular dependent on the shape, in particular the curve, of the outer lens of the headlamp 3 and, by extension, on the design of the vehicle.

Figure 3:
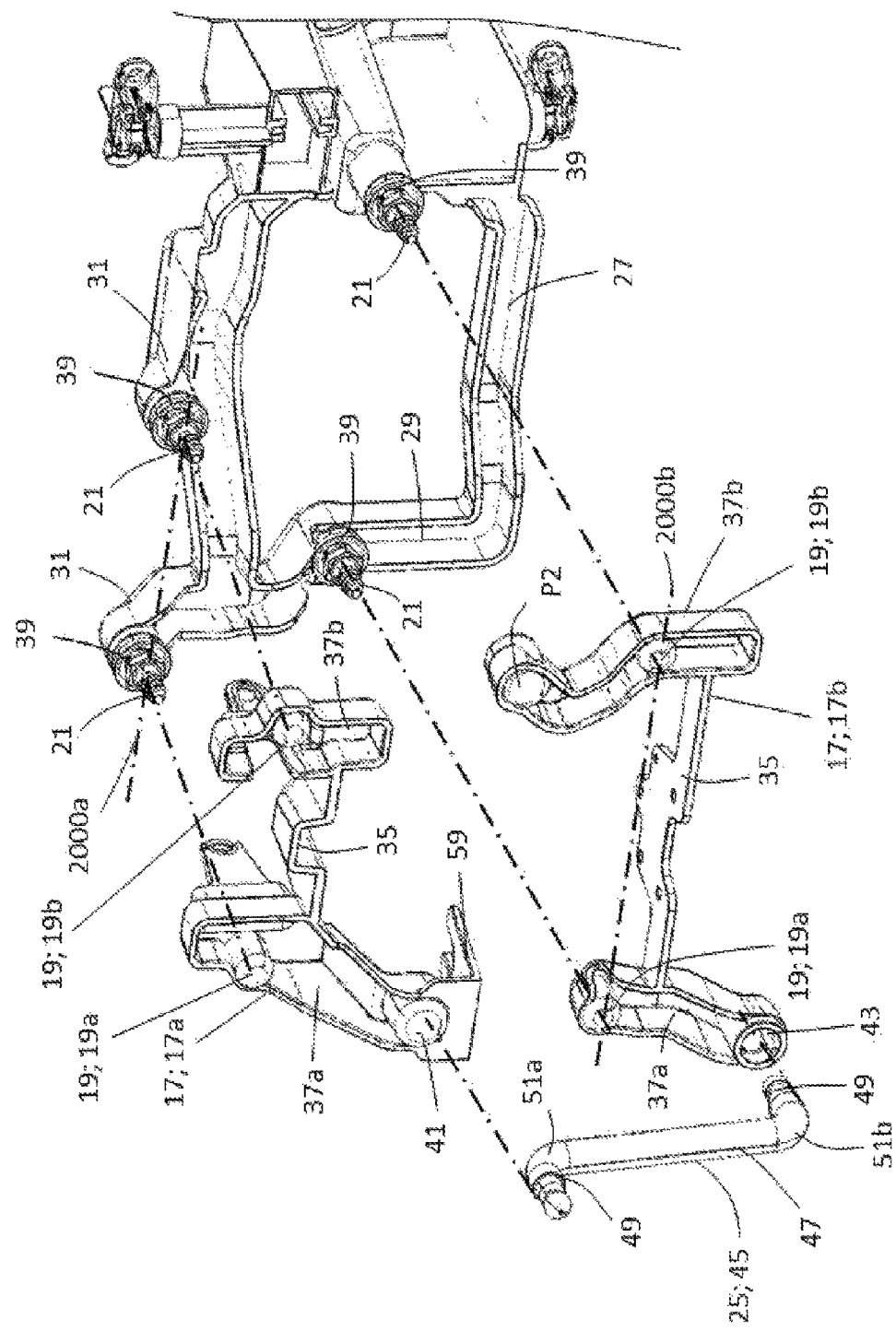
FIG. 3 is an exploded schematic depiction of the lighting device in FIG. 2, without luminous modules.
Figure 4:
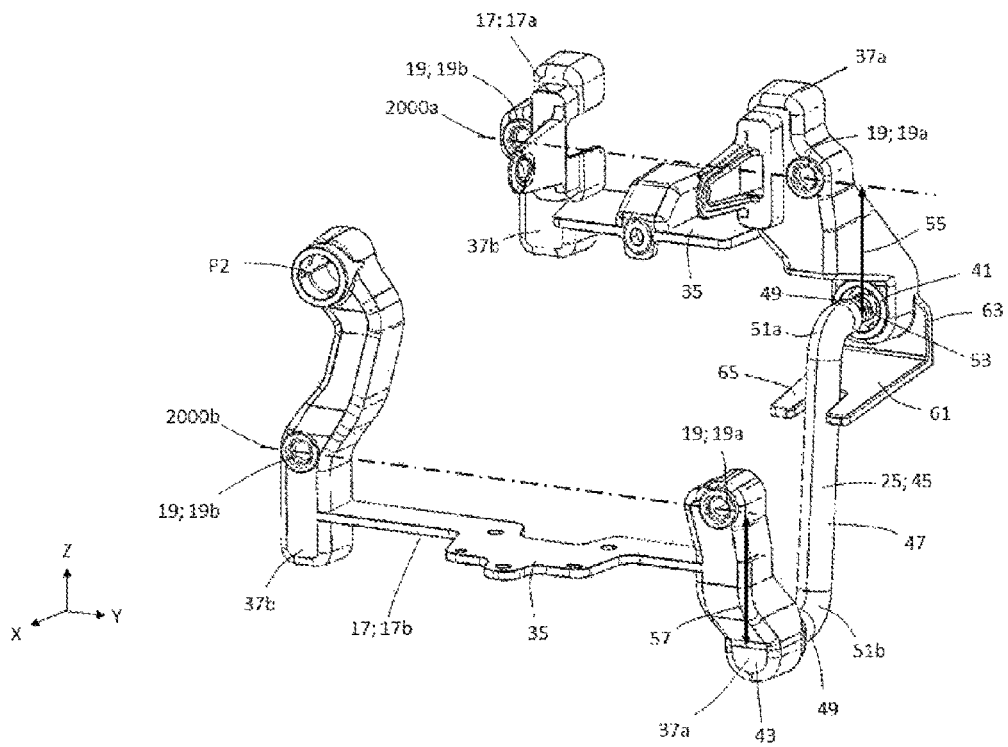
FIG. 4 is a schematic depiction of an assembly formed by a first intermediate support and a second intermediate support.

The coupling member 25 can comprise a rod 45, as shown in FIGS. 2 to 4. The rod 45 is indirectly connected to the first module 11a via the first intermediate support 17a in the first coupling zone 41 and is indirectly connected to the second module 11b via the second intermediate support 17b in the second coupling zone 43. In order to limit the footprint generated by the coupling member 25 and in order to adapt to the offset, both vertical and longitudinal, the rod 45 is advantageously bent. It comprises in particular a straight, or substantially straight, intermediate portion 47, and two opposite end portions 49, each intended to be mounted on one of the intermediate supports 17 and each connected to the intermediate portion 47 by an elbow 51. In particular, a first elbow 51a extends in the vicinity of the first coupling zone 41, while a second elbow 51b extends in the vicinity of the second coupling zone 43.

The rod 45 is particularly S-shaped, or substantially S-shaped, that is, the two end portions 49 of the rod 45 extend transversely to the intermediate portion 47 and facing opposite ways along the same direction. Here, when the lighting device 7 is assembled and positioned in the vehicle, the intermediate portion 47 extends vertically, or substantially vertically, while the end portions 49 extend transversely, in particular perpendicular thereto. In the example illustrated, a first end portion 49 of the rod 45, connected to the first intermediate support 17a, extends toward the rear, while an opposite second end portion 49 extends toward the front.

Each end portion 49 bears a connecting element 53 configured to interact by complementary shapes with a receiving element contained in one of the intermediate supports 17. The connecting elements in particular take the form of at least partially circular heads so as to form a ball joint connection with the different intermediate supports 17, as can be seen in FIG. 3.

Each of the intermediate supports 17 is thus connected at at least three "points" or zones to another component of the lighting device. In the connections made between the pivot points 19 and the main mounting plate 9, a center of said connection remains substantially fixed in space relative to an initial position, or a rest position. Conversely, a center of the connecting existing between one of the coupling zones 41, 43 and the coupling member 25 is moved along a direction of extension of the intermediate portion 47, in this instance along the vertical or substantially vertical direction Z.

As set out above, within a given intermediate support 17, the two pivot points 19 are aligned so as to define the pivot axis 2000 of the module 11 and of the support in question. The coupling zone specific to the intermediate support 17 in question is offset relative to the pivot axis 2000, in particular along the direction defined by the first adjustment axis 1000, that is in this case the vertical direction Z.

Figure 5:
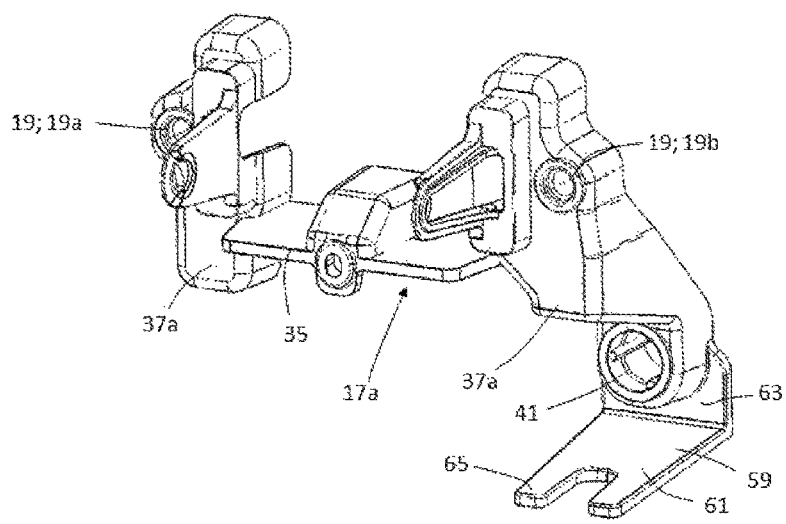
FIG. 5 is a schematic depiction of an exemplary embodiment of the first intermediate support.

Preferably, the coupling zone 43, 44 is arranged in one of the arms 37 of the intermediate support 17, at a non-zero distance from the pivot point 19 contained in this same arm 37. For example, as illustrated in FIG. 4 or 5 in the case of the first intermediate support 17a, the first arm 37a comprises the first pivot point 19a and the first coupling zone 41, these being positioned in particular in opposite end portions of the arm 37. Conversely, the second pivot point 19b has a more central position, along the vertical direction Z, within the second arm 37.

Similarly, in the second intermediate support 17b, the first arm 37a comprises the first pivot point 19a of the second pivot axis 2000 and the second coupling zone 43, the latter preferably having an end position within the first arm 37a.

In addition, within the lighting device 7, the first coupling zone 43 and the second coupling zone 44 are preferably positioned so that they are aligned, or substantially aligned, along the direction defined by the first adjustment axis 1000, namely in this case the vertical direction Z.

Further, optionally but preferably, a distance, along the direction defined by the first adjustment axis 1000, separating the pivot axis 2000 of one of the two modules 11 from the first coupling zone 41, is identical to a distance separating the pivot axis 2000 of the other of the two modules 11 from the second coupling zone 43. In the example illustrated, the first pivot axis 2000a of the first module 11a is thus separated from the first coupling zone 41 by a distance 55, defined along the vertical direction Z, equal to the distance 57 separating the second pivot axis 2000b from the second coupling zone 43. Such positioning of the coupling zones 41, 43 particularly aims to reduce the variations in the degree of tilt between the two modules 11 when the movement of one of the two modules is transferred to the other of said modules.

In the exemplary embodiment illustrated, the second adjustment means 23 are indirectly connected to the first and second modules 11a, 11b via the second intermediate support 17b. In particular, the second adjustment means 23 are connected to the second intermediate support 17b at the second actuation point P2, which is contained in one of the arms 37 of said support. More specifically, the second actuation point P2 is positioned in the second arm 37b at a non-zero distance from the pivot axis 2000b along the vertical direction Z. Thus, depending on the automatic or manual vertical adjustment command instructions received, the second adjustment means 23 pull or push the second intermediate support 17b at the second actuation point P2 so as to pivot the second intermediate support 17b, and by extension the second module 11b, about the second pivot axis 2000b in one direction or the other in order to point the beam emitted by each of these modules 11 further away or nearer on the roadway.

Optionally, in order to ensure optimum transfer of the movement of one module 11 to the other, the lighting device 7 can comprise at least one guide means 59 for guiding the coupling member 25. The at least one guide means 59 can be at least partially connected to the intermediate support 17 specific to one of the two modules 11 and/or at least partially connected to the intermediate support 17 specific to the other of the two modules 11.

For example, as shown in FIG. 4 or 5, the guide means 59 can comprise a fin 61 connected to the first intermediate support 17a. The fin 61 comprises an attachment portion 63, connected to the first arm 37a of the first intermediate support 17a, and a guide portion 65, capable of receiving and/or interacting with the coupling member 25. The attachment portion 63 and the guide portion 65 can in particular extend transversely to each other, for example perpendicularly. The fin 61 can be added and fastened to the first intermediate support 17a or, alternatively, can be integrally formed therewith.

The guide portion 65 is configured to limit the movements of the rod 45 along at least one direction transverse, in particular orthogonal, to the direction of extension of the rod 45 and/or the direction of the first adjustment axis 1000. In this instance, the guide means 59 contribute to optimizing the movement of the rod 45 along the vertical direction Z while limiting its movements both ways along the transverse direction Y in particular. Here, the guide portion 65 has a substantially open U shape bordering an opening capable of receiving all or part of the coupling member 25, in particular here the intermediate portion 47 of the rod 45. In the example illustrated, it has a shape complementary to the rod 45 and only limits the movements thereof one way along the longitudinal direction X, here toward the rear of the vehicle 1. According to one alternative, not shown, the guide portion 65 can be closed, that is, the opening is delimited by a continuous edge so that the movements of the blocking means are limited both ways along the longitudinal direction X.

The fin 61 is positioned in the vicinity of the first coupling zone 41. As a result, the guide portion 65 extends transversely to the vertical direction Z, in the direction of the coupling member 25. Preferably, the guide portion 65 interacts with the straight intermediate portion 47 of the rod 45.

Advantageously, the guide means 59 can be configured to limit the movements of the coupling member 25 along three directions. In particular, the fin 61 of the guide means 59 can be configured to form a stop for the coupling member 25, along the transverse direction Y and along all or part of the longitudinal direction X, as set out above, and along the direction of movement of the rod 45, here the vertical direction Z. For example, the guide means 59 form a stop for at least one of the elbows 51 of the rod 45 at least one way along the vertical direction Z. Such an arrangement makes it possible in particular to limit the travel of the luminous module 11 in question.

Figure 6:
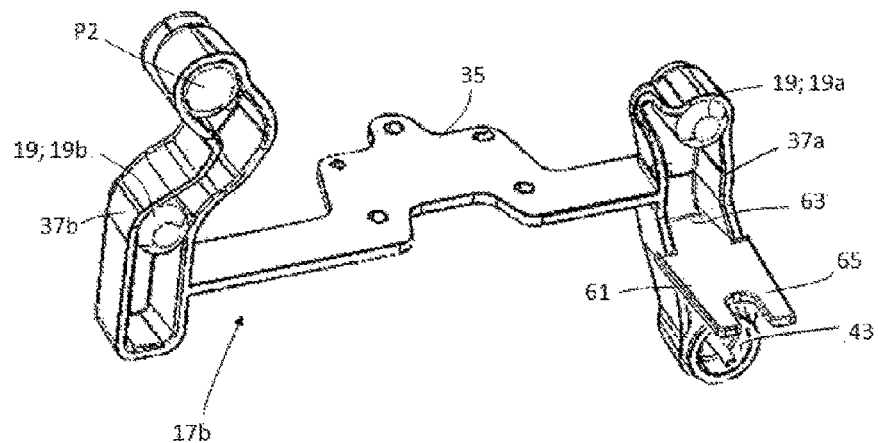
FIG. 6 is a schematic depiction of an exemplary embodiment of the second intermediate support.

Alternatively or additionally, for example, as shown in FIG. 6, the guide means 59 can comprise a fin 61 connected to the second intermediate support 17b. Such a fin 61 is similar to the fin described with reference to the first intermediate support 17a and the description above applies mutatis mutandis. Here, it extends in the vicinity of the second coupling zone 43. In the particular case of an S-shaped rod, the fin 61 of the second intermediate support 17b can for example extend toward the front of the vehicle 1.

According to an alternative embodiment, not shown, the guide means 59 can advantageously comprise a plurality of fins 61. In particular, a first fin 61 can be connected to the first intermediate support 17a, while a second fin 61 can be connected to the second intermediate support 17b, each in the vicinity of one of the coupling zones 41, 43. Said fins 61 can then particularly be oriented opposite ways in the longitudinal direction, for example one toward the front of the vehicle and the other toward the rear.

When a user wishes to adjust the height of the light beams emitted by the two modules 11a, 11b, they thus control the tilting of the second module 11b via the second adjustment means 23. The second adjustment means 23 exert a force on the second actuation point P2 in order to tilt the second intermediate support 17b, in particular the plate 35 thereof, and by extension the second module 11b, about the second pivot axis 2000b. For example, such a force is exerted along the longitudinal direction X so as to pull or push said support. Simultaneously, the coupling member 25, rigidly connected to the second intermediate support 17b, is driven and the tilting movement performed by the second module 11b is transferred to the first module 11a. For example, when the second module 11b is tilted upward, the rod 45 is translated along the direction of extension of the rod, here orthogonal to the pivot axes 2000a, 2000b, that is along the vertical direction Z. The position of the rod 45 is thus lowered so that the intermediate portion 47 descends along the vertical direction Z. The movements of the rod 45 along the transverse direction and at least part of the longitudinal direction are limited by the guide means 59, so that the movement is transferred as accurately as possible. Said movement is transferred to the first module 11a, the connecting element 53 in the second coupling zone 43 being lowered and tilting the second module 11b upward about the second pivot axis 2000b. The coupling member 25 thus makes it possible to tilt the first luminous module 11a in the same pivot direction and at the same degree of tilt as the second module 11b. The two luminous modules 11 are thus adjusted simultaneously by tilting about their respective pivot axes 2000a, 2000b and a single vertical adjustment command is transmitted uniformly to the two modules 11.

Figure 7:
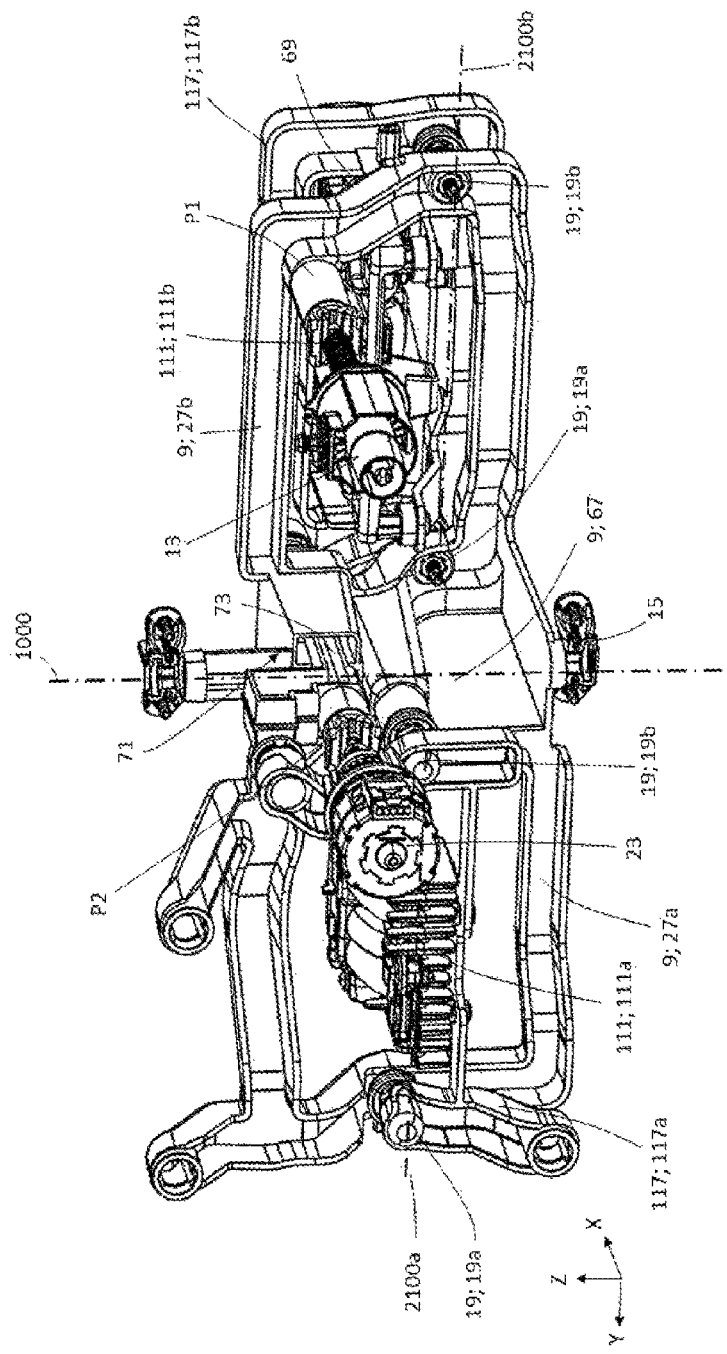
FIG. 7 is a schematic depiction of a lighting device according to a second embodiment.
Figure 8:
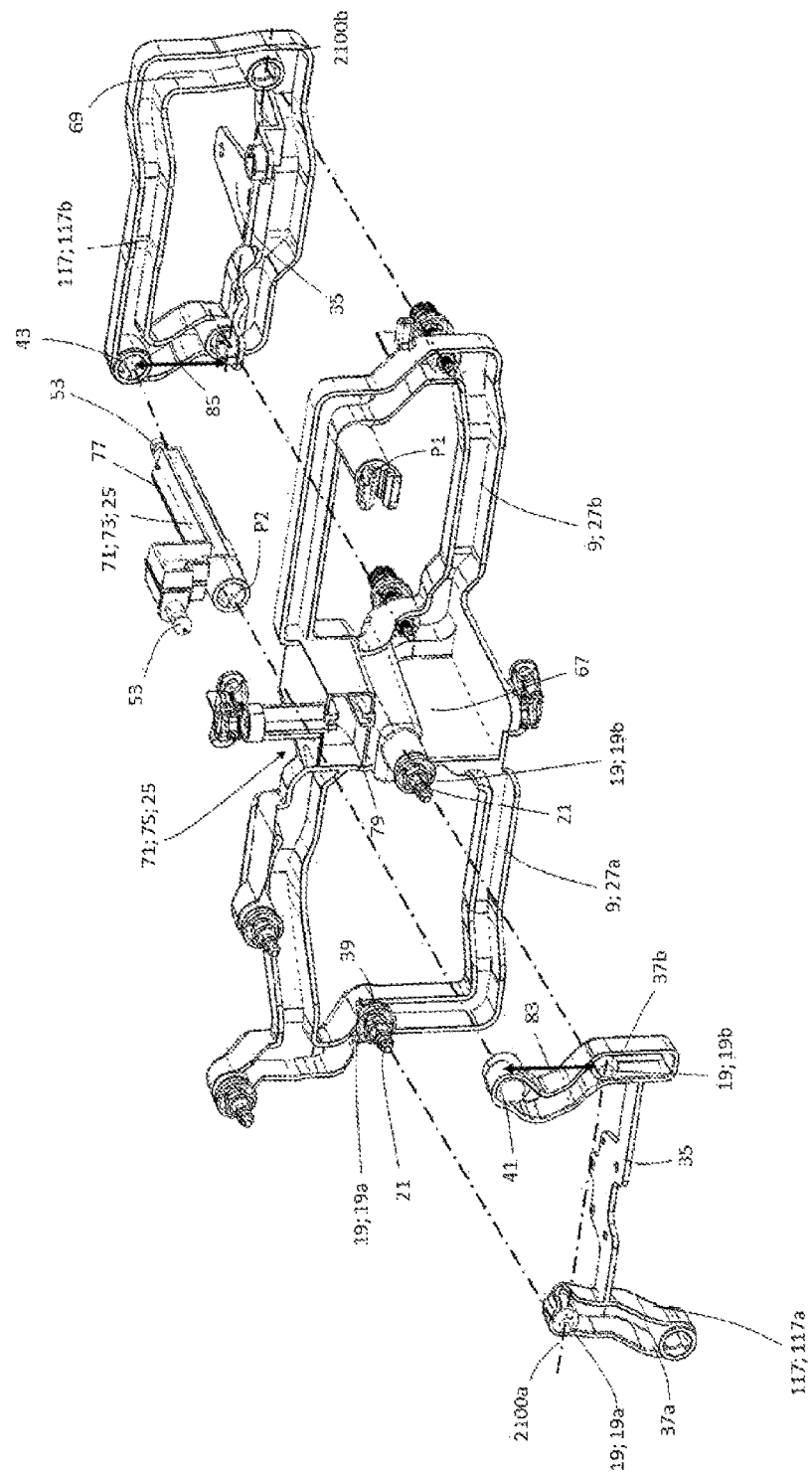
FIG. 8 is an exploded schematic depiction of the lighting device in FIG. 7, without luminous modules.
Figure 9:
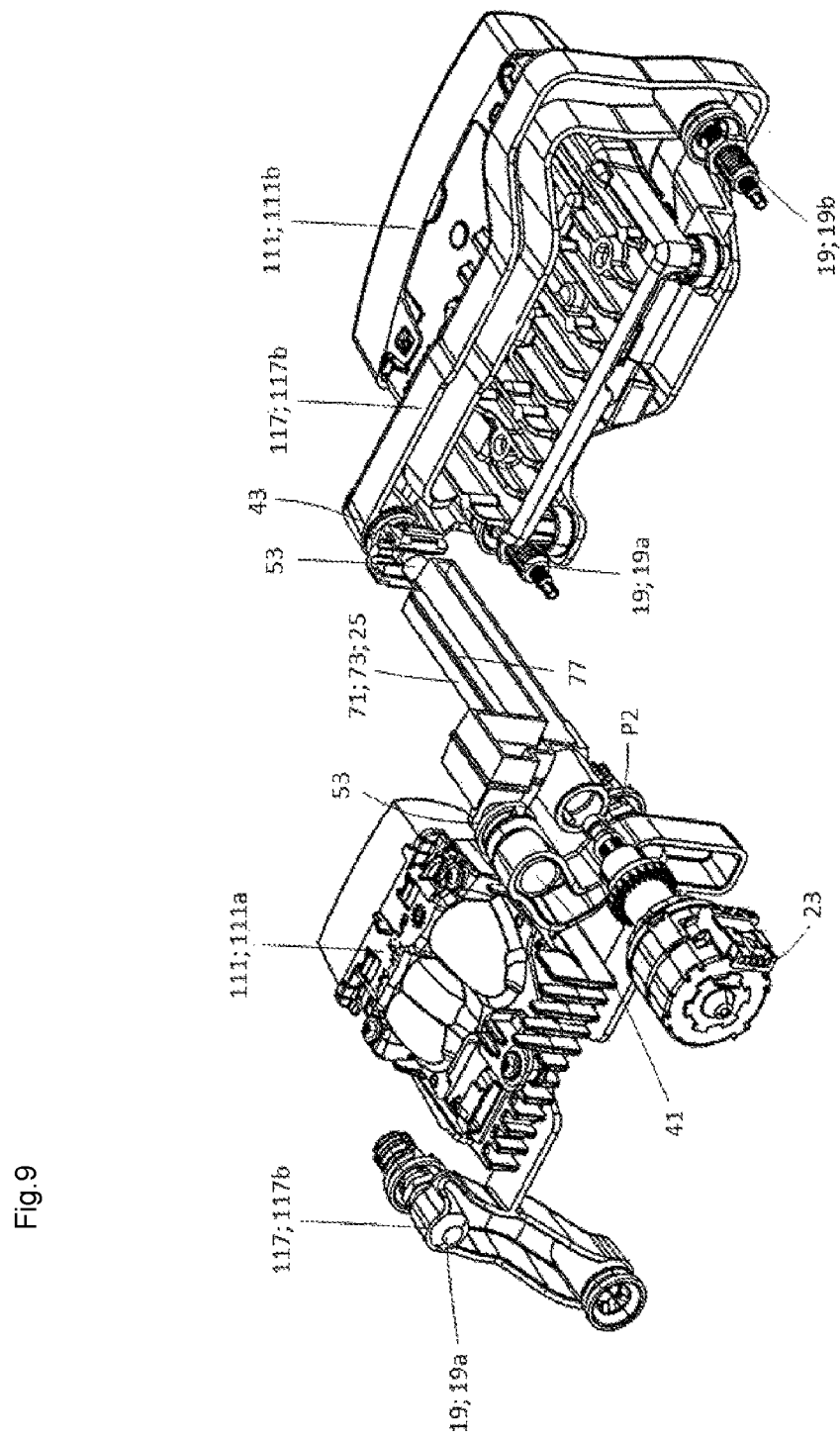
FIG. 9 is a schematic depiction of an assembly formed by a first intermediate support and a second intermediate support of the lighting device illustrated in FIG. 7.

FIGS. 7 to 9 illustrate a second embodiment of the lighting device 7 according to the invention, in which the relative positioning of the two luminous modules 11, connected to each other by the at least one coupling member 25, is different from that described above. Such an embodiment adopts the principles of the first embodiment and the description above therefore applies mutatis mutandis, unless stated otherwise. For the sake of clarity, the same reference signs are used for identical or substantially identical components. The reference signs relating to the luminous modules and to the intermediate supports are increased by 100 in order to differentiate the positioning thereof from the first embodiment; the modules are thus denoted by reference sign 111, while the intermediate supports are denoted by reference sign 117.

The second embodiment differs in particular from the first in that the two luminous modules 111 are juxtaposed along a direction parallel to the pivot axes 2100, here along a horizontal or transverse direction Y. In other words, the first module 111a and the second module 111b extend at least partially facing each other along the transverse direction Y; the same horizontal plane, comprising the longitudinal X and transverse Y directions, thus passes through the first module 111a and the second module 111b. By way of example, the first module 111a can in particular be a low beam lamp, while the second module 111b can be a high beam lamp.

Similarly to the disclosure above with reference to the first embodiment, the two luminous modules 111 are also offset relative to each other along the direction orthogonal to the first adjustment axis 1000 and to the pivot axes. In this instance, the second module 111b is offset toward the front relative to the first module 111a along the longitudinal direction X.

Similarly to the first embodiment, the main mounting plate 9 comprises at least one frame 27. In particular, in the example illustrated, the main mounting plate 9 comprises a first frame 27a and a second frame 27b, connected to each other at a common central branch 67. Each of the first frame 27a and second frame 27b is configured to receive at least one luminous module 111 of the two connected modules 111. In this instance, the first frame 27a receives the first module 111a and the first intermediate support 117a, while the second frame 27b receives the second module 111b and the second intermediate support 117b.

In the description below, the first luminous module 111a and the first intermediate support 117a can adopt all or some of the features relating to the second module 11b and the second intermediate support 17b respectively as described above with reference to the first embodiment. The first intermediate support 117a comprises a plate 35 and two arms 37. Each arm 37 comprises a pivot point 19 formed by a connection with the main mounting plate 9, here produced on the first frame 27a, and defining the first pivot axis 2100a of the first intermediate support 117a, and by extension of the first module 111a. In particular, the arm 37 of the first intermediate support 117a interacts with two opposite branches 29 of the first frame 27a.

According to a non-limiting exemplary embodiment, the second intermediate support 117b takes the form of a closed frame comprising a plurality of segments 69. Here, "segment" is given to mean a part of a whole. For example, the second intermediate support 117b can extend at least partially in the continuation of the second frame 27b of the main mounting plate 9 along the longitudinal direction X. Alternatively, the second intermediate support 117b can have an open shape, for example being U-shaped or substantially U-shaped. The second intermediate support 117b is positioned so that, along the longitudinal direction X, that is, along the direction orthogonal to the different pivot axes 2100 and to the first adjustment axis 1000, the main mounting plate 9 is interposed between the first intermediate support 117a and the second intermediate support 117b. The second intermediate support 117b comprises two pivot points 19 defining the second pivot axis 2100b of the second intermediate support 117b and of the second module 111b. Said pivot points 19 are arranged in opposite segments 69 of the second intermediate support 117b.

The first module 111a and the second module 111b are connected to each other via the coupling member 25. In the present embodiment, the coupling member 25 comprises a slider 71 connected to a first coupling zone 41, contained in the first intermediate support 117a, and to a second coupling zone 43, contained in the second intermediate support 117b. In particular, the slider 71 comprises a bar 73 two opposite ends of which bear an element 53 for connection to one of the intermediate supports 117. The bar 73 is particularly connected to the first intermediate support 117a and to the second intermediate support 117b via ball joint connections, as set out above with reference to the rod 45, connected to the first coupling zone 41 and the second coupling zone 43.

The bar 73 is also configured to interact with the main mounting plate 9 in order to be moved transversely, in particular perpendicularly, to the first adjustment axis 1000 and to the pivot axes 2100. In particular, the bar is moved along the longitudinal direction X or along a substantially longitudinal direction. The bar 73 in particular has a shape complementary to a rail 75 contained in the main mounting plate 9. To this end, it comprises at least one rib 77 configured to interact with at least one groove 79 contained in the rail 75.

The slider 71 is preferably arranged in proximity to the second adjustment means 23. It extends essentially along the longitudinal direction X, between the first pivot axis 2100a and the second pivot axis 2100b. The rail 75 is particularly incorporated into the central branch 67 common to the two frames 27a, 27b of the main mounting plate 9 in the example illustrated. Likewise, the slider is connected to or bears the second actuation point P2. In particular, the bar bears the second actuation point P2.

The bar 73, depicted schematically in FIGS. 8 and 9, is controlled to translate by command instructions coming from the second adjustment means 23, comprising for example a motor. The groove 79 of the rail 75 is configured to guide the bar 73 in an appropriate translation. The translation of the bar 73 of the slider 71 relative to the main mounting plate 9 exerts simultaneous force on the first coupling zone 41 and on the second coupling zone 43, which causes the tilting of the first intermediate support 117a, the second intermediate support 117b, and by extension the luminous modules 111 that they bear, about the pivot axis 2100 specific thereto.

In order to ensure identical tilting of the first module 111a and the second module 111b, the positioning of the coupling zones 41, 43 is particularly defined so that a distance 83, along the direction defined by the first adjustment axis 1000, separating the first pivot axis 2100a of the first module 111a from the first coupling zone 41, is identical to a distance 85 separating the second pivot axis 2100b of the second module 111b from the second coupling zone 43.

Thus, as set out above, when a user wishes to adjust the height of the light beams emitted by the two modules 111, they command the tilting of the first luminous module 111a via the second actuation point P2. The second adjustment means 23 exert a force on the second actuation point P2 in order to tilt the first intermediate support 117a, and by extension the first module 111a, about the first pivot axis 2100a. For example, such a force is exerted along the longitudinal direction so as to pull or push said support. Simultaneously, within the slider 71, the bar 73 rigidly connected to the first intermediate support 117a is driven and translated relative to the rail 75 of the main mounting plate 9, Such a movement is then transferred to the second module 111b.

For example, when the first module 111a is tilted upward, the bar 73 is simultaneously translated along the longitudinal direction toward the rear and, as a result, pulls the second module 111b so as to tilt it in the same pivot direction and at the same degree of tilt as the first luminous module 111a.

Figure 10:
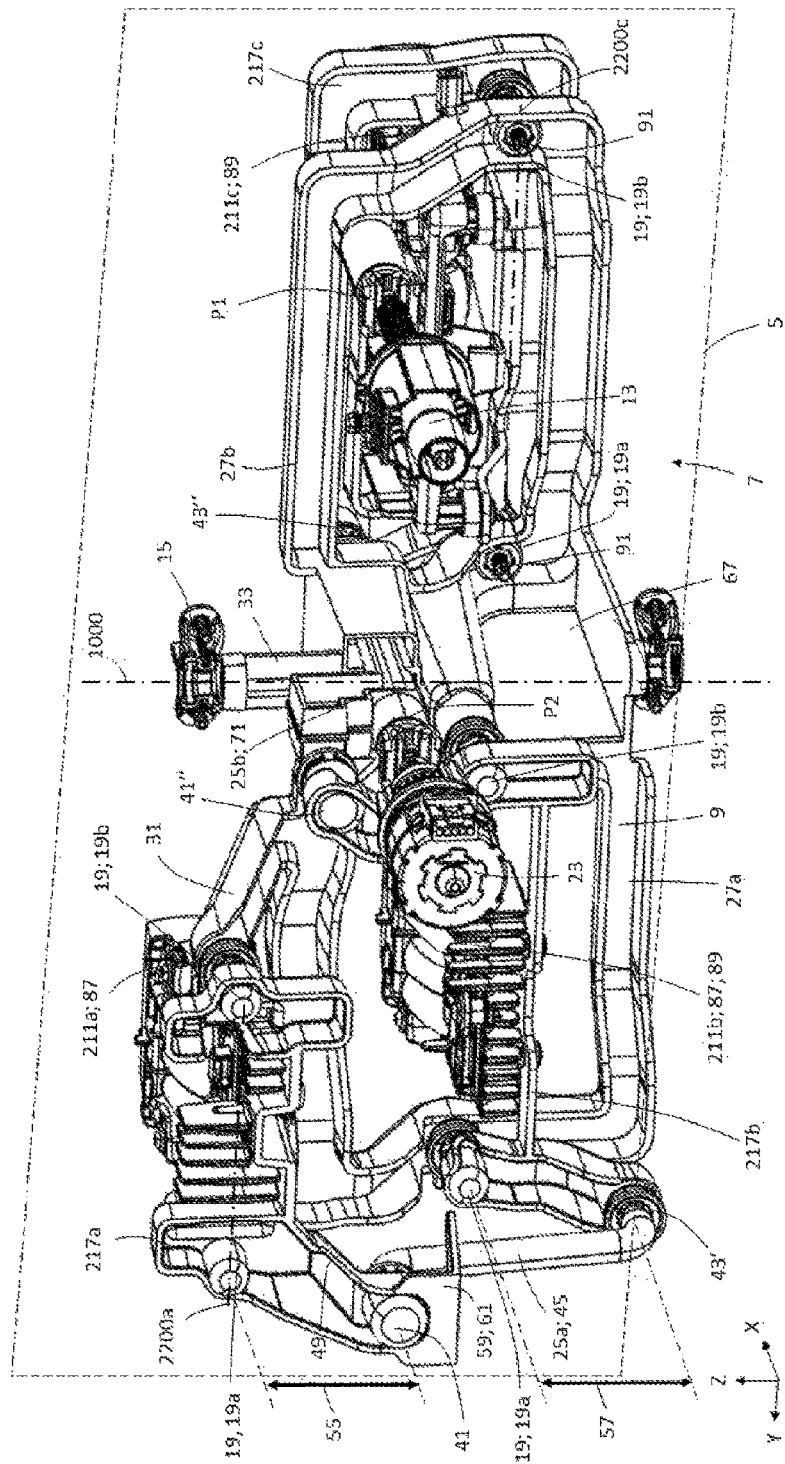
FIG. 10 is a schematic depiction of a lighting device according to a third embodiment.
Figure 11:
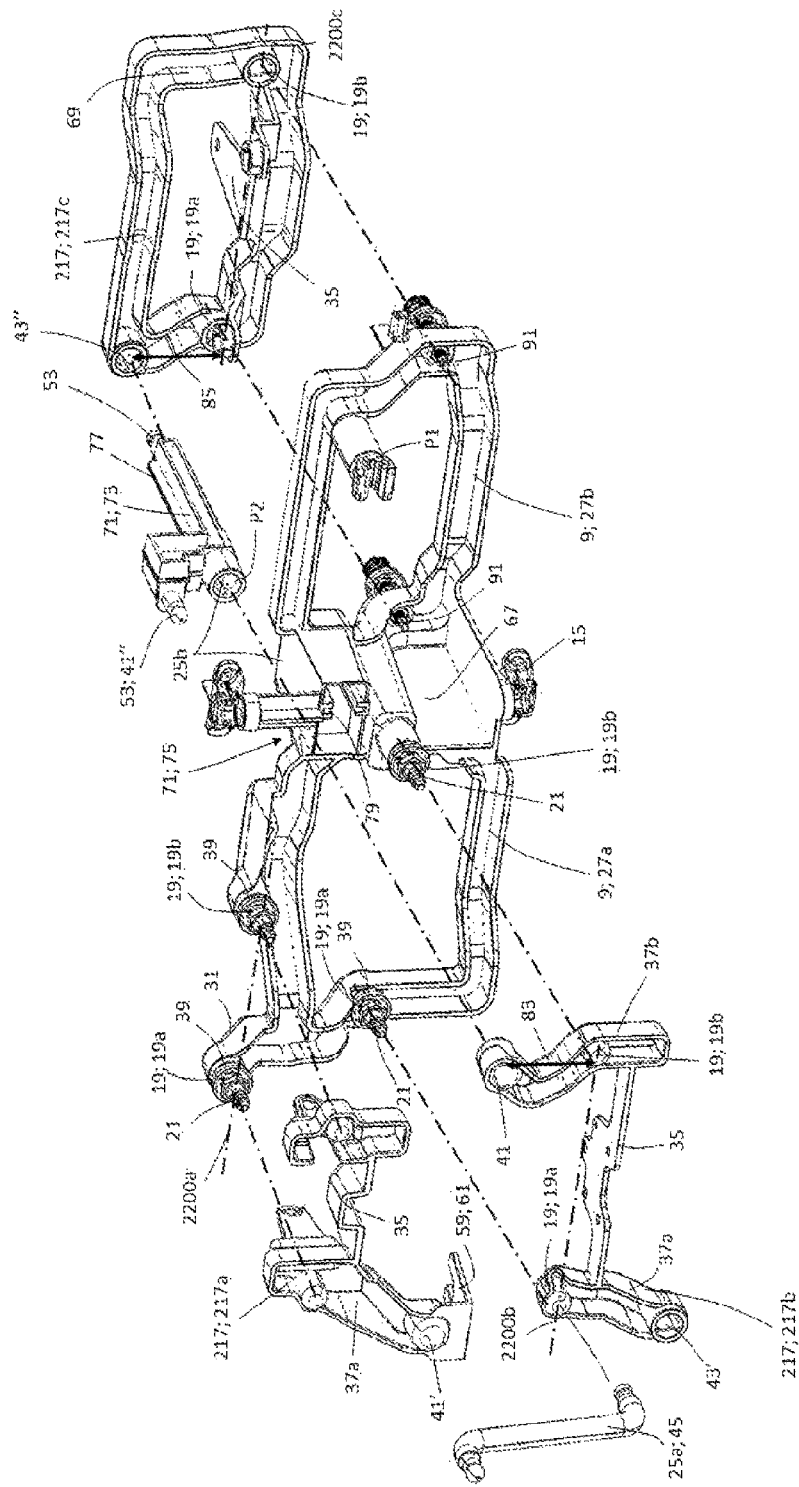
FIG. 11 is an exploded schematic depiction of the lighting device in FIG. 10, without luminous modules.
Figure 12:
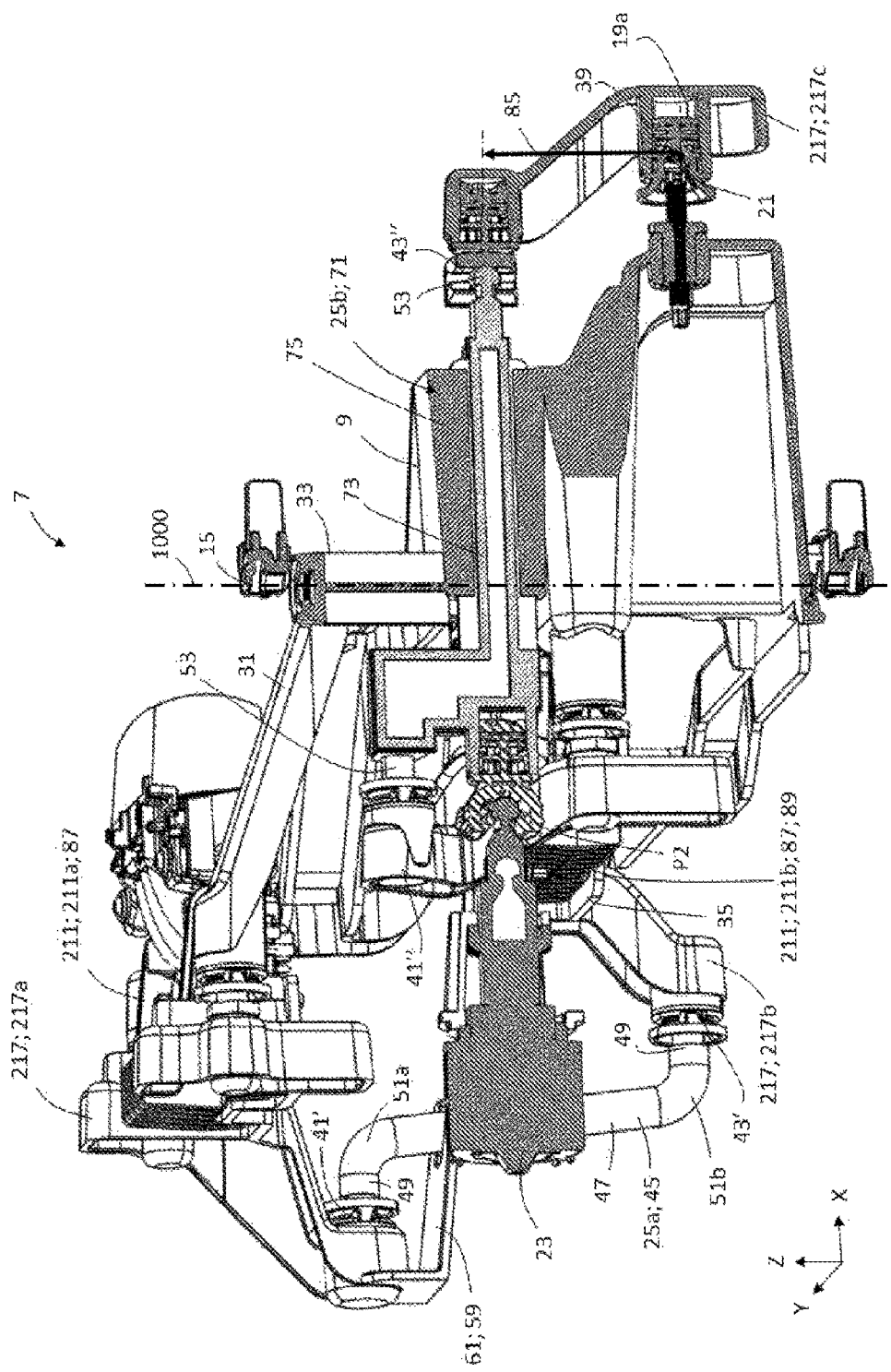
FIG. 12 is a cross-sectional schematic depiction of the lighting device illustrated in FIG. 10.

Finally, FIGS. 10 to 12 illustrate a third embodiment in which the lighting device 7 comprises three luminous modules. For the sake of clarity, the same reference signs are used for components identical or substantially identical to the first or second embodiment, unless stated otherwise. The reference signs relating to the luminous modules and intermediate supports are increased by 200 from the first embodiment.

In the present embodiment, a first luminous module 211a and a second luminous module 211b are contained in a sub-assembly that can be configured according to the first embodiment. A third luminous module 211c is movably mounted on the main mounting plate 9 via a third intermediate support 217c at two adjustable pivot points 19 defining a third pivot axis 2200c specific to the third module 211c and parallel to the pivot axes of the first module 211a and the second module 211b. In such a lighting device 7, the first adjustment means 13 advantageously allow the simultaneous movement of the three modules 211 about the first adjustment axis 1000 via the main mounting plate 9, while at least the modules 211 contained in the sub-assembly, that is connected together by the coupling member 25, can be moved simultaneously via the second adjustment means 23.

In the particular embodiment illustrated, the first luminous module 211a and the second luminous module 211b form a first sub-assembly 87 configured according to the first embodiment, while the second module 211b and the third module 211c form a second sub-assembly 89 configured according to the second embodiment as set out above. The description above therefore applies mutatis mutandis to each of said sub-assemblies, in particular with respect to the relative positioning of the luminous modules and coupling members described. In particular, in such an exemplary embodiment, the second luminous module 211b is common to the first sub-assembly 87 and the second sub-assembly 89. Similarly, the main mounting plate 9 is common to the two sub-assemblies.

In the example illustrated, the first module 211a and the second module 211b emit two beams that together form a low beam. For example, the first module can form a beam comprising a flat or substantially flat upper cut-off, corresponding to a "flat" beam, and the second module can form a beam comprising an upper cut-off with an oblique portion, corresponding to a "kink" beam. The third module 211c emits a beam forming a supplementary high beam that supplements the low beam formed by the first module 211a and the second module 211b. The superposing of the beams formed by the first luminous module 211a, the second luminous module 211b, and the third luminous module 211c, thus forms a high beam.

The second luminous module 211b is connected to the first module 211a by a coupling member 25, referred to as the first coupling member 25a, comprising a rod 45 as set out above. The second module 211b is further connected to the third module 211c by a coupling member 25 separate from the first coupling member 25a, referred to as the second coupling member 25b and comprising a slider 71 as described above. The three modules 211 are thus connected to each other, directly or indirectly, so that the adjustment of one of said modules 211 via the second adjustment means 23 thus allows the simultaneous movement of the three modules 211 about their respective pivot axes 2200. It will be noted that the first luminous module 111a and the first intermediate support 117a of the second embodiment correspond here to the second luminous module 211b and the second intermediate support 217b respectively, while the second luminous module 11b and the second intermediate support 17b of the first embodiment correspond to the third luminous module 211c and the third intermediate support 217c in the present embodiment.

The main mounting plate 9 can in particular adopt all or some of the features set out above with reference to the first and second embodiments. In this instance, the main mounting plate comprises a first frame 27a, on which the second module 11b extends, a second frame 27b, connected to the first frame 27a, on which the third luminous module 211c extends, and two members 31, connected to the first frame 27a and bearing the first luminous module 11a.

Preferably, the first adjustment means 13 are positioned on the main mounting plate 9 at a non-zero distance from the first adjustment axis 1000, in particular in the vicinity of the third luminous module 211c. The first adjustment axis 1000 is also preferably centered, or substantially centered, within the main mounting plate 9 along a direction parallel to the pivot axes 2100, namely here the transverse direction Y. The first adjustment axis 1000 is in particular interposed between at least two of the three luminous modules 211 along the transverse direction Z. Here, the first adjustment axis 1000 is interposed between the first module 211a and the second module 211b, and the third module 211c.

Similarly, the second adjustment means 23 are positioned in the vicinity of a central zone of the main mounting plate 9 along the transverse direction Y, in particular on the central branch 67, in the vicinity of the second coupling member 25b. Further, the second adjustment means 23 are positioned so that they are interposed between at least two pivot axes 2200, specific to two separate modules 211, along the direction defined by the first adjustment axis 1000, that is the vertical direction here. In this instance, the second adjustment means are interposed between the first pivot axis 2200a, and the second and third pivot axes 2200b, 2200c.

In particular, the adjustment device is configured so that:
on the first coupling member 25a, the first pivot axis 2200a of the first module 211a is separated from the first coupling zone 41' by a distance 55, defined along the vertical direction Z, equal to a distance 57 separating the second pivot axis 2000b from the second coupling zone 43' of the first coupling member 25a; and
on the second coupling member 25b, the positioning of the coupling zones 41", 43" is particularly defined so that a distance 83, along the direction defined by the first adjustment axis 1000, separating the second pivot axis 2200b of the second module 211b from the first coupling zone 41", is identical to a distance 85 separating the third pivot axis 2200c of the third module 211c from the second coupling zone 43".

Likewise, said distances 55, 57, 83, 85 are preferably equal or substantially equal. Such positioning of the coupling zones specific to each of the coupling members 25 particularly aims to reduce the variations in the degree of tilt between the three modules 211.

As set out above, when the height adjustment of the light beams emitted by the different modules 211 is commanded, the second adjustment means 23 thus exert a force on the second actuation point P2 and particularly on the intermediate support 217b of the second module 211b, causing the tilting of the second module 211b about the second pivot axis 2200b. As described above, simultaneously, the bar 73 rigidly connected to the third intermediate support 217c is driven and translated relative to the rail 75 of the main mounting plate 9. The third module 211c is then tilted to the same extent as the second module 211b. In parallel, the tilting of the second module 211b drives the first coupling member 25a, rigidly connected to the first intermediate support 217a. The movement of the rod 45 is transferred to the first module 211a, the connecting means in the second coupling zone 43' lowering and tilting the first module 211a in the same pivot direction and at the same degree of tilt as the second and third luminous modules 211b, 211c. The luminous modules 211 are thus adjusted simultaneously by tilting about their respective pivot axes 2000 and a single adjustment command is transmitted uniformly to the three modules 211.

According to an alternative exemplary embodiment of the third embodiment, not shown, the lighting device 7 comprises three luminous modules of which a first luminous module and a second luminous module are contained in a sub-assembly that can be configured according to the second embodiment as set out above. A third luminous module is movably mounted on the main mounting plate 9 via an intermediate support at two pivot points defining a pivot axis specific to the third luminous module and parallel to the pivot axes of the first module and the second module. The description above, given with reference to the third embodiment in particular, applies mutatis mutandis to the present alternative. In particular, similarly to the description set out above, the lighting device 7 is advantageously configured so that the first adjustment means 13 allow the simultaneous movement of the three modules about the first adjustment axis 1000 via the main mounting plate 9 and the second adjustment means 23 allow the simultaneous movement of at least two of the three modules about the pivot axis specific thereto.

The lighting device 7 according to the invention thus allows the simultaneous horizontal and vertical adjustment of a plurality of luminous modules 211 via at least one coupling member 25. The lighting device 7 according to the invention is advantageously suitable for a limited space, in particular in the front end of a vehicle 1, the proposed solution having a reduced footprint.

Further, irrespective of the embodiment implemented, at least one module of the plurality of modules can be provided with micro-adjustment means 91, specific to said module, allowing the vertical and/or horizontal adjustment thereof, or in other words its adjustment about the pivot axis specific to it or about an axis parallel to the first adjustment axis 1000 respectively. Micro-adjustment is given to mean an adjustment with a small amplitude, that will in particular not be transferred to any other module of the plurality of modules connected to the module in question. By way of non-limiting example, such an adjustment can be of the order of ±1°. In this instance, in the third embodiment, the third module 211c is provided with such micro-adjustment means 211c independently of the other two. In particular, the micro-adjustment means 91 are provided at the pivot points 19 of the module in question. The activation of the micro-adjustment means 91 thus allows the adjustment alone of the position of the module, and by extension the adjustment of the alignment of the light beams emitted, to which it is connected independently of the other modules of the plurality of modules. It will be noted that one or more micro-adjustment means 91 can also be incorporated into at least one of the modules of the plurality of modules as set out with reference to the first embodiment or the second embodiment.

The present invention is not however limited to the means and configurations described and illustrated herein, and also extends to any equivalent means or configuration and to any technically functional combination of such means provided that they ultimately perform the functions described and illustrated in the present document.

The invention claimed is:

1. A lighting device for a headlamp, in particular a front headlamp, of a vehicle, the lighting device comprising a main mounting plate, a plurality of separate luminous modules including at least two luminous modules, each mounted on an intermediate support, each intermediate support being movably mounted, relative to the main mounting plate, about a pivot axis specific to the luminous module in question, the pivot axis being a horizontal axis, the pivot axes of the at least two luminous modules being parallel and separate, the lighting device further comprising:
a first adjustment means configured to move the main mounting plate about a first adjustment axis, the first adjustment axis being a vertical axis, orthogonal to the pivot axes of the plurality of separate luminous modules, and allowing simultaneous movement of the plurality of separate luminous modules;
a second adjustment means configured to move at least two modules of the plurality of separate luminous modules simultaneously relative to the main mounting plate, each by tilting about a respective pivot axis; and
at least one coupling member for coupling an assembly or sub-assembly of two luminous modules of the plurality of separate luminous modules, connecting the intermediate supports bearing said two luminous modules so as to allow the simultaneous movement of said two luminous modules by transfer of movement of one of the two luminous modules to the other of the two luminous modules and movement of the other of the two luminous modules to the one of the two luminous modules, wherein the at least two luminous modules include a first luminous module, a second luminous module, and a third luminous module, the third luminous module being movably mounted on the main mounting plate via one of the intermediate supports at two pivot points defining a third pivot axis specific to the third luminous module and parallel to a first pivot axis of the first luminous module and a second pivot axis of the second luminous module, the lighting device being configured so that the first adjustment means allows the simultaneous movement of the first, second, and third luminous modules about the first adjustment axis via the main mounting plate and the second adjustment means allows simultaneous movement of at least two of the first, second, and third luminous modules about respective pivot axes of the at least two luminous modules of the first, second, and third luminous modules, and the first luminous module and the second luminous module are at least partially superposed along a vertical direction orthogonal to the pivot axes, and the second luminous module and the third luminous module are juxtaposed along a horizontal direction parallel to the pivot axes, the at least one coupling member comprising a first coupling member for coupling the first luminous module and the second luminous module connecting the intermediate supports bearing the first and second luminous modules so as to allow the simultaneous movement of the first and second luminous modules by transfer of the movement of one of the first and second luminous modules to the other of the first and second luminous modules and movement of the other of the first and second luminous modules to the one of the first and second luminous modules, and a second coupling member for coupling the second luminous module to the third luminous module connecting the intermediate supports bearing the second and third luminous modules so as to allow the simultaneous movement of the second and third luminous modules by transfer of movement of one of the second and third luminous modules to the other of the second and third luminous modules and movement of the other of the second and third luminous modules to the one of the second and third luminous modules, so that the second adjustment means allow the simultaneous movement of the first, second, and third luminous modules about the respective pivot axes.

2. The lighting device as claimed in claim 1, wherein the first and second luminous modules are offset relative to each other along a direction orthogonal to the first adjustment axis and to the pivot axes, the direction being a longitudinal direction along a length of the vehicle.

3. The lighting device as claimed in claim 2, further comprising at least one guide means for guiding the first coupling member at least partially connected to the intermediate support specific to the first luminous module or at least partially connected to the intermediate support specific to the second luminous module.

4. The lighting device as claimed in claim 1, wherein the first coupling member comprises a rod connected to one of the first and second luminous modules in a first coupling zone and to the other of the first and second luminous modules in a second coupling zone, the rod being bent so that the rod has at least a first elbow, extending in a vicinity of the first coupling zone, and a second elbow, extending in a vicinity of the second coupling zone.

5. The lighting device as claimed in claim 1, further comprising at least one guide means for guiding the first coupling member at least partially connected to the intermediate support specific to the first luminous module or at least partially connected to the intermediate support specific to the second luminous module.

6. The lighting device as claimed in claim 1, wherein the second and third luminous modules are offset relative to each other along a direction orthogonal to the first adjustment axis and to the pivot axes, the direction being a longitudinal direction along a length of the vehicle.

7. The lighting device as claimed in claim 6, wherein the second coupling member comprises a slider connected to one of the second and third luminous modules in a first coupling zone and to the other of the second and third luminous modules in a second coupling zone, the slider being configured to interact with the main mounting plate in order to be moved along a direction perpendicular to the first adjustment axis and to the pivot axes, the direction being a longitudinal direction along a length of the vehicle.

8. The lighting device as claimed in claim 1, wherein the second coupling member comprises a slider connected to one of the second and third luminous modules in a first coupling zone and to the other of the second and third luminous modules in a second coupling zone, the slider being configured to interact with the main mounting plate in order to be moved along a direction perpendicular to the first adjustment axis and to the pivot axes, the direction being a longitudinal direction along a length of the vehicle.

9. The lighting device as claimed in claim 1, wherein the second and the third luminous modules are offset relative to each other along a direction orthogonal to the first adjustment axis and to the pivot axes, the direction being a longitudinal direction along a length of the vehicle.

10. The lighting device as claimed in claim 9, wherein the first coupling member comprises a rod connected to one of the first and second luminous modules in a first coupling zone and to the other of the first and second luminous modules in a second coupling zone, the rod being bent so that the rod has at least a first elbow, extending in a vicinity of the first coupling zone, and a second elbow, extending in a vicinity of the second coupling zone.

11. The lighting device as claimed in claim 10, wherein the lighting device further comprises at least one guide means for guiding the first coupling member at least partially connected to the intermediate support specific to the first luminous module or at least partially connected to the intermediate support specific to the second luminous modules.

12. The lighting device as claimed in claim 10, wherein the second coupling member comprises a slider connected to one of the second and third luminous modules in a first coupling zone and to the other of the second and third luminous modules in a second coupling zone, the slider being configured to interact with the main mounting plate in order to be moved along a direction perpendicular to the first adjustment axis and to the pivot axes, the direction being a longitudinal direction along a length of the vehicle.

13. The lighting device as claimed in claim 1, wherein the first adjustment axis is centered within the main mounting plate along a direction parallel to the pivot axes.

14. The lighting device as claimed in claim 2, wherein the first coupling member comprises a rod connected to one of the first and second luminous modules in a first coupling zone and to the other of the first and second luminous modules in a second coupling zone, the rod being bent so that the rod has at least a first elbow, extending in a vicinity of the first coupling zone, and a second elbow, extending in a vicinity of the second coupling zone.

* * * * *